US012328690B2

(12) United States Patent
Wang et al.

(10) Patent No.: US 12,328,690 B2
(45) Date of Patent: Jun. 10, 2025

(54) METHOD AND SYSTEM FOR BEAM SWEEPING

(71) Applicant: Verizon Patent and Licensing Inc., Basking Ridge, NJ (US)

(72) Inventors: Xin Wang, Morris Plains, NJ (US); Shuang Echo Yang, Naperville, IL (US); Nischal Patel, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 532 days.

(21) Appl. No.: 17/671,825

(22) Filed: Feb. 15, 2022

(65) Prior Publication Data
US 2023/0262622 A1    Aug. 17, 2023

(51) Int. Cl.
*H04W 4/00* (2018.01)
*H04W 16/28* (2009.01)
*H04W 56/00* (2009.01)
*H04W 74/0833* (2024.01)

(52) U.S. Cl.
CPC ......... *H04W 56/001* (2013.01); *H04W 16/28* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 2020/0059927 A1* | 2/2020 | Sun | H04W 56/0015 |
| 2021/0051683 A1* | 2/2021 | Li | H04W 72/12 |
| 2023/0044718 A1* | 2/2023 | Sakhnini | H04W 56/001 |
| 2023/0105748 A1* | 4/2023 | Abedini | H04W 52/325 370/318 |

* cited by examiner

*Primary Examiner* — Zewdu A Beyen

(57) ABSTRACT

A method, a device, and a non-transitory storage medium are described in which a beam sweeping service is provided. The service may include generating multiple and different synchronization signal block burst sets that have different periodicities. The synchronization signal block burst sets may have different priorities based on one or multiple criteria. The one or multiple criteria may include radio beam utilization. The service may also include a multi-tier random access based on the multi-tier synchronization signal block burst sets.

20 Claims, 6 Drawing Sheets

100

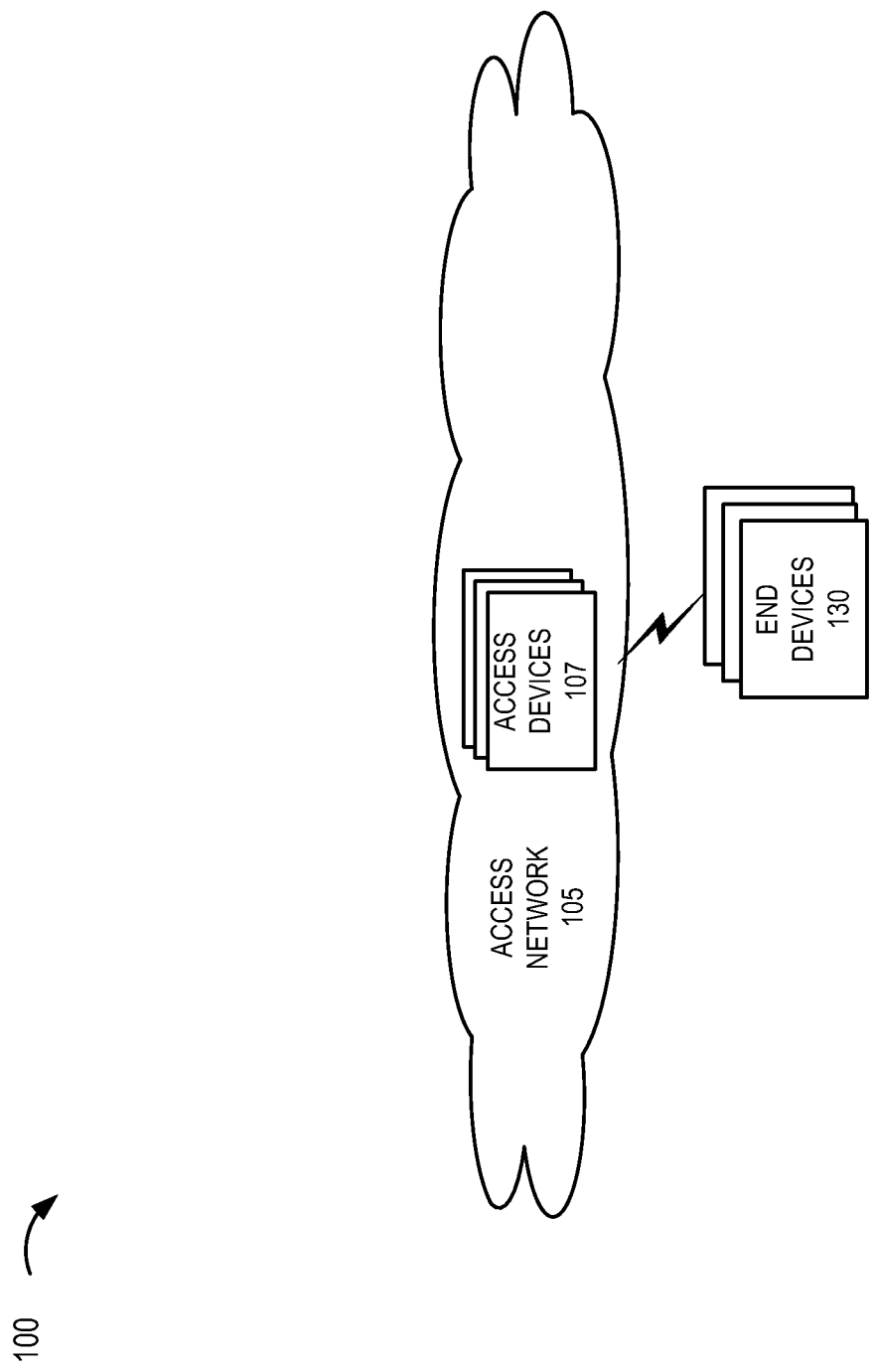

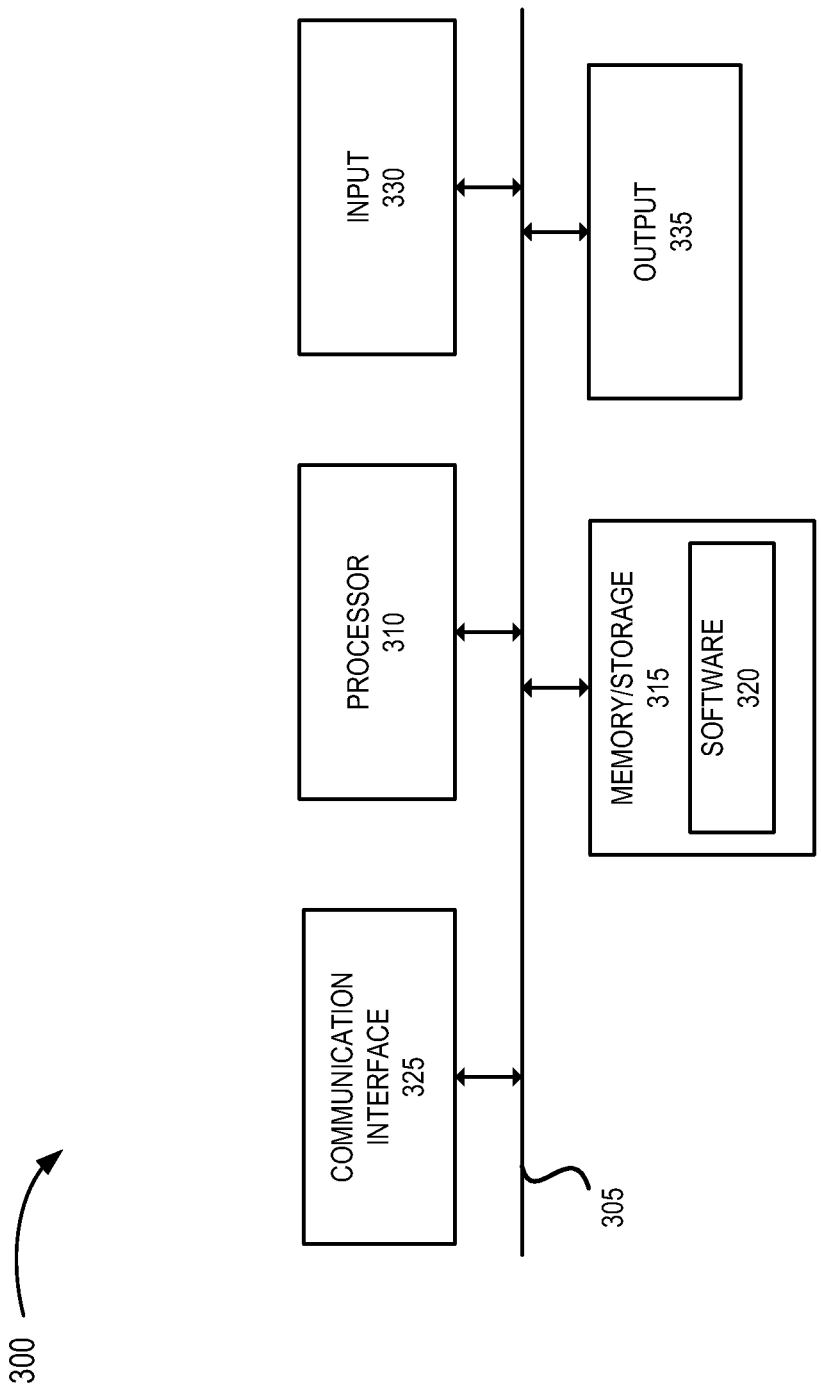

500

TRANSMIT SSB BURST SETS ACCORDING TO A MULTI-PRIORITY CONFIGURATION
505

PROVIDE RACH OPPORTUNITIES TO END DEVICES BASED ON THE MULTI-PRIOIRTY CONFIGURATION
510

METHOD AND SYSTEM FOR BEAM SWEEPING

BACKGROUND

Development and design of networks present certain challenges from a network-side perspective and an end device perspective. For example, Next Generation (NG) wireless networks, such as Fifth Generation New Radio (5G NR) networks are being deployed and under development.

BRIEF DESCRIPTION OF THE DRAWINGS

FIG. 1 is a diagram illustrating an exemplary environment in which an exemplary embodiment of a beam sweeping service may be implemented;

FIG. 3 is a diagram illustrating exemplary components of a device that may correspond to one or more of the devices illustrated and described herein;

DETAILED DESCRIPTION

Figure 2A:
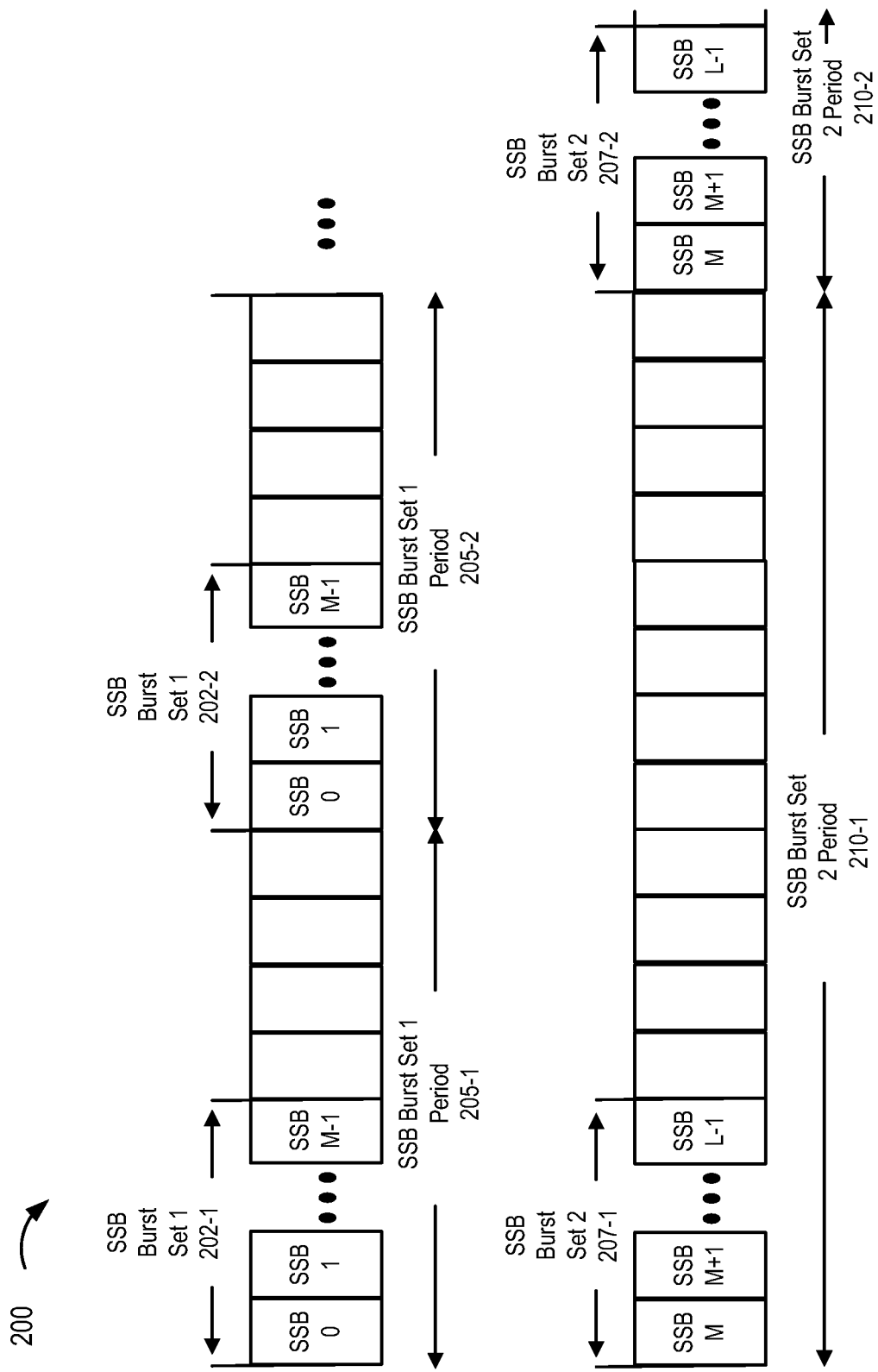
FIG. 2A is a diagram illustrating an exemplary configuration of an exemplary embodiment of the beam sweeping service.

The following detailed description refers to the accompanying drawings. The same reference numbers in different drawings may identify the same or similar elements. Also, the following detailed description does not limit the invention.

In a radio access network (RAN), such as a 5G RAN, there may be multiple frequency bands used, such as below 6 GHz, above 6 GHz, millimeter (mm) wave, centimeter (cm) wave, or another type of division, range, and/or nomenclature of radio spectrum. The higher the frequencies or radio spectrum used to support a service area coverage, the greater the number of radio beams (referred to hereinafter as simply "beams") may be required due to propagation loss associated with wavelength. Also, as a counterbalance for propagation loss, the antenna gain may be increased, among other things, to support a desired coverage area for each beam.

In the RAN, cell-specific synchronization and reference signals may be transmitted, such as a Synchronization Signal Block (SSB) transmission. In 5G NR, the SSB transmission may include primary and secondary synchronization signals (PSS and SSS) and a physical broadcast channel (PBCH). Different transmission patterns for SSBs have been defined by network standard bodies that may differ depending on parameters, such as frequency range, the maximum number of SSB transmissions, subcarrier spacing, and orthogonal frequency division multiplexing (OFDM) symbols, for example.

SSBs may be organized in SSB burst sets. An SSB burst set may include one or multiple SSBs. A maximum number of SSBs within an SSB burst set (Lmax) during a given time window has been specified by network standard bodies. According to a 5G NR beam sweep procedure, SSB transmissions may sweep through all the beams to cover the service area. For example, a single SSB burst set may include SSBs for all the beams and the SSB burst set may be transmitted periodically.

This approach, however, may lead to significant SSB overhead and may reduce the traffic transmission efficiency of the air interface because each beam is treated equally among other beams of a service coverage area. Yet, the beams of the service coverage area may have different traffic loads, be associated with different application services, different network slices, and/or other types of differing criteria or metrics.

Further, the random access channel (RACH) is also beam-based and there is a mapping between each SSB transmission and a RACH resource. Thus, under the same RACH resource configuration, more beams can result in longer RACH delay and poorer application experience.

According to exemplary embodiments, a beam sweeping service is described. According to an exemplary embodiment, the beam sweeping service may provide for multiple SSB burst sets having different SSB periods. The SSB burst sets and SSB periods may be configured based on context information, as described herein. For example, beams covering heavy traffic areas and beams covering light traffic areas may have different burst sets with different SSB periods.

According to an exemplary embodiment, an SSB burst set period may include a time value in accordance with a network standard, as described herein. According to an exemplary embodiment, different tiers of SSB burst sets may be transmitted according to a period value calculated based on a tier of an SSB burst set of a multi-tier SSB burst set system, as described herein. According to an exemplary embodiment, a RACH association with an SSB burst set may be based on a tiered system, as described herein. For example, a RACH association corresponding to a greater number of SSB burst sets may have a higher priority than another RACH association corresponding to a fewer number of SSB burst sets.

In view of the foregoing, the beam sweeping service may improve the efficiency of network resources, facilitate configuration flexibilities, and improve RACH delay for end devices.

FIG. 1 is a diagram illustrating an exemplary environment 100 in which an exemplary embodiment of beam sweeping service may be implemented. As illustrated, environment 100 includes an access network 105. Access network 105 includes access devices 107 (also referred to individually or generally as access device 107). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), or another type of network that may support a wireless service, as described herein.

A network device, a network element, or a network function (referred to herein simply as a network device) may be implemented according to one or multiple network architectures, such as a client device, a server device, a peer device, a proxy device, and/or a virtualized network device. Additionally, a network device may be implemented according to various computing architectures, such as centralized, distributed, and/or another type of computing architecture, and may be incorporated into diverse types of network architectures (e.g., Software Defined Networking (SDN), virtual, logical, network slice, etc.). The number, the type, and the arrangement of network devices, and the number of end devices 130 are exemplary. For purposes of description, end device 130 is not considered a network device.

Environment 100 includes communication links between the networks, between the network devices, and between end devices 130 and the network/network devices. Environment 100 may be implemented to include wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. According to various exemplary implementations, the interface of the network device may be a service-based interface, a reference point-based interface, an Open Radio Access Network (O-RAN) interface, a Fifth Generation (5G) interface, another generation of interface (e.g., 5.5G, Sixth Generation (6G), Seventh Generation (7G), etc.), or some other type of interface.

Access network 105 may include one or multiple networks of one or multiple types and technologies. For example, access network 105 may be implemented to include a 5G RAN, a future generation RAN (e.g., a 6G RAN, a 7G RAN, or a subsequent generation RAN), a centralized-RAN (C-RAN), and/or another type of access network. Access network 105 may include a legacy RAN (e.g., a Third Generation (3G) RAN, a Fourth Generation (4G) or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105.

Access network 105 may include different and multiple functional splitting, such as options 1, 2, 3, 4, 5, 6, 7, or 8 that relate to combinations of access network 105 and a core network including, for example, an evolved packet core (EPC) network and/or an 5G core network, or the splitting of the various layers (e.g., physical layer, medium access control (MAC) layer, radio link control (RLC) layer, packet data convergence protocol (PDCP) layer, and/or other layers), plane splitting (e.g., user plane, control plane, etc.), a centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher, carrier aggregation (CA), edge and core network slicing, coordinated multipoint (CoMP), various duplex schemes, and/or another type of connectivity service (e.g., non-standalone (NSA) new radio (NR), stand-alone (SA) NR, and the like).

Depending on the implementation, access network 105 may include one or multiple types of network devices, such as access devices 107. For example, access device 107 may include a next generation Node B (gNB), an evolved LTE (eLTE), an evolved Node B (eNB), a remote radio head (RRH), a baseband unit (BBU), a radio unit (RU), a centralized unit (CU), a CU control plane (CU CP), a CU user plane (CU UP), a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Access device 107 may also include other types of network devices, such as a radio network controller (RNC), a RAN Intelligent Controller (RIC), an orchestrator device, an artificial intelligence (AI) and/or machine learning (ML) device, or another type of RAN management or control level network device.

According to various exemplary implementations, access device 107 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), two dimensional (2D) beamforming, antenna spacing, tilt (relative to the ground), radiation pattern, directivity, elevation, planar arrays, and so forth. Depending on the implementation, access device 107 may provide a wireless access service at a cell, a sector, a sub-sector (also known as a geo-bin), and/or another configurable level.

According to an exemplary embodiment, at least some of the diverse types of access devices 107, as described herein, may include logic that provides the beam sweeping service, as described herein.

End device 130 may include a device that may have computational and/or wireless communication capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of UE). End device 130 may be configured to execute various types of software (e.g., applications, programs, etc.). The number and the types of software may vary among end devices 130. End devices 130 may include "edge-aware" and/or "edge-unaware" application service clients.

End device 130 may support one or multiple RATs (e.g., 4G, 5G, and/or future generation RAT) and various portions of the radio spectrum (e.g., multiple RF bands, multiple carrier frequencies, licensed, unlicensed, millimeter (mm) wave, above mm wave, centimeter (cm) wave, etc.), various levels and genres of network slicing, DC service, CA service, and/or other types of connectivity services. Additionally, end device 130 may include one or multiple communication interfaces that provide one or multiple (e.g., simultaneous, interleaved, etc.) connections via the same or different RATs, radio spectrum, frequency bands, carrier frequencies, network slices, and/or via another communication medium (e.g., wired, etc.). The multimode capabilities of end device 130 may vary among end devices 130.

According to an exemplary embodiment, the beam sweeping service may generate the multiple SSB burst sets with different SSB periods based on one or multiple criteria. For example, the one or multiple criteria may relate to beam utilization (e.g., traffic load) associated with a beam, a performance metric (e.g., latency, bitrate, throughput, or the like) associated with an application service and a beam, and/or a network slice associated with a beam. The one or multiple criteria may also relate to one or multiple deployment characteristics, such as urban canyon, suburban with lower buildings, city block(s), stadium/in-venue, mobility versus fixed wireless, different terrain, varying elevation coverage needs, different antenna tilt configurations, and/or the like.

According to an exemplary embodiment, the beam sweeping service may adapt the SSBs included in each SSB burst set and/or each periodicity in accordance with a dynamic/non-static nature of the one or multiple criteria. For example, the beam utilization of a beam associated with access device 107 may change over time. In this regard, an SSB relating to a beam that may be included in an SSB burst set and associated with heavy traffic and having a shorter periodicity (e.g., transmitted more frequently) may change to another SSB burst set and associated periodicity. The beam sweeping service may provide a dynamic SSB configuration.

According to an exemplary embodiment, the beam sweeping service may determine a tier (within a multi-tier framework) for an SSB burst set based on the corresponding beam utilization and/or other criteria, as described herein. As an example, heavily used beams may be associated with an SSB burst set 1 and less heavily or lighter used beams may be associated with an SSB burst set 2. The beam sweeping service may calculate and configure different periodicities of transmission for each of SSB burst set 1 and SSB burst set 2. According to other examples, there may be more than two SSB burst sets (e.g., 3 or more SSB burst sets) depending on the configured granularity for beam utilization and more than two periodicity values. According to such an example, generally speaking, higher tiered SSBs may be transmitted more frequently than lower tiered SSBs. In this way, according to this example, SSBs associated with the SSB burst set 1 relating to heavily used beams may be transmitted more frequently than SSBs associated with the SSB burst set 2 relating to lightly or less heavily used beams.

The beam sweeping service may include obtaining information pertaining to the one or multiple criteria, analyzing the information, and/or using the analyzed information to generate an SSB configuration. For example, the beam sweeping service may include obtaining measurements of beam utilization (e.g., via a network counter, a log file (e.g., for packets), or the like) for each beam relating to a time period. The beam sweeping service may analyze the beam utilization and based on the analysis generate an SSB beam configuration that includes multiple SSB burst sets and multiple periodicities for SSB transmission. Some or all of these steps may be performed by access device 107.

FIG. 2A is a diagram illustrating an exemplary SSB configuration 200 of an exemplary embodiment of the beam sweeping service. Referring to FIG. 2A, the beam sweeping service may generate multiple SSB burst sets with different SSB periods. The multiple SSB burst sets, in combination, may include all the SSBs covering the service area of access device 107.

As illustrated in FIG. 2A, SSB configuration 200 includes an SSB burst set 1 202 and an SSB burst set 2 207. SSB burst set 1 202 may have an SSB burst set 1 period 205 and SSB burst set 2 207 may have an SSB burst set 2 period 210. The SSBs are indexed from 0 to L-1, in which L corresponds to the total number of beams of a service coverage area. For example, SSB burst set 1 202 in combination with SSB burst set 2 207 may include all the beams of a service coverage area in which SSB burst set 1 202 includes SSBs indexed from 0 to M-1 and SSB burst set 2 207 includes SSBs indexed from M to L-1.

For purposes of illustration, the periodicity for each SSB burst set is provided. For example, an SSB burst set 1 period 205-1 and SSB burst set 1 period 205-2 (also referred to individually or generally as SSB burst set 1 period 205) associated with SSB burst sets 1 202-1 and 202-2 (also referred to individually or generally as SSB burst set 1 202) may be transmitted twice as frequently compared to SSB burst sets 2 207-1 and 207-2 (also referred to individually or generally as SSB burst set 2 207) associated with SSB burst set 2 periods 210-1 and 210-2 (also referred to individually or generally as SSB burst set 2 period 210). According to other examples, the relative periodicities between SSB burst sets may be different as well as the number of different SSB burst sets. Additionally, the time alignment between SSB burst set 1 202-1 and SSB burst set 207-1 is merely illustrative for description purposes and according to other examples may be different.

FIG. 2A illustrates and describes an exemplary SSB configuration of an exemplary embodiment of the beam sweeping service, however according to other exemplary embodiments, the beam sweeping service may provide a different configuration. For example, according to other exemplary embodiment, the number of different SSB burst sets and/or the SSB transmission periodicity may be different.

As previously mentioned, according to an exemplary embodiment, the SSB burst set period may include time values in accordance with a network standard. For example, the beam sweeping service may include SSB burst set periods, such as 5 milliseconds (ms), 10 ms, 20 ms, 40 ms, 80 ms, 160 ms, and/or another time period of a network standard that may afford a backward compatibility. The beam sweeping service may include SSB burst set periods that may not be specified in a network standard.

Additionally, as previously stated, according to an exemplary embodiment, different tiers of SSB burst sets may be transmitted according to a period value calculated based on a tier of an SSB burst set of a multi-tier SSB burst set system. For example, the SSB burst set period may be calculated based on the following exemplary expression:

$$P(\text{higher tier}) = 2^k * P(\text{lower tier}) \qquad (1),$$

where k is a non-zero integer value. P indicates an SSB burst set period having an argument relating to tier (e.g., high, low, medium, or the like) or relative tier (e.g., higher, lower, or the like) and associated numerical value. The number of tiers (e.g., two or more) may be configurable based on the one or multiple criteria.

Figure 2B:
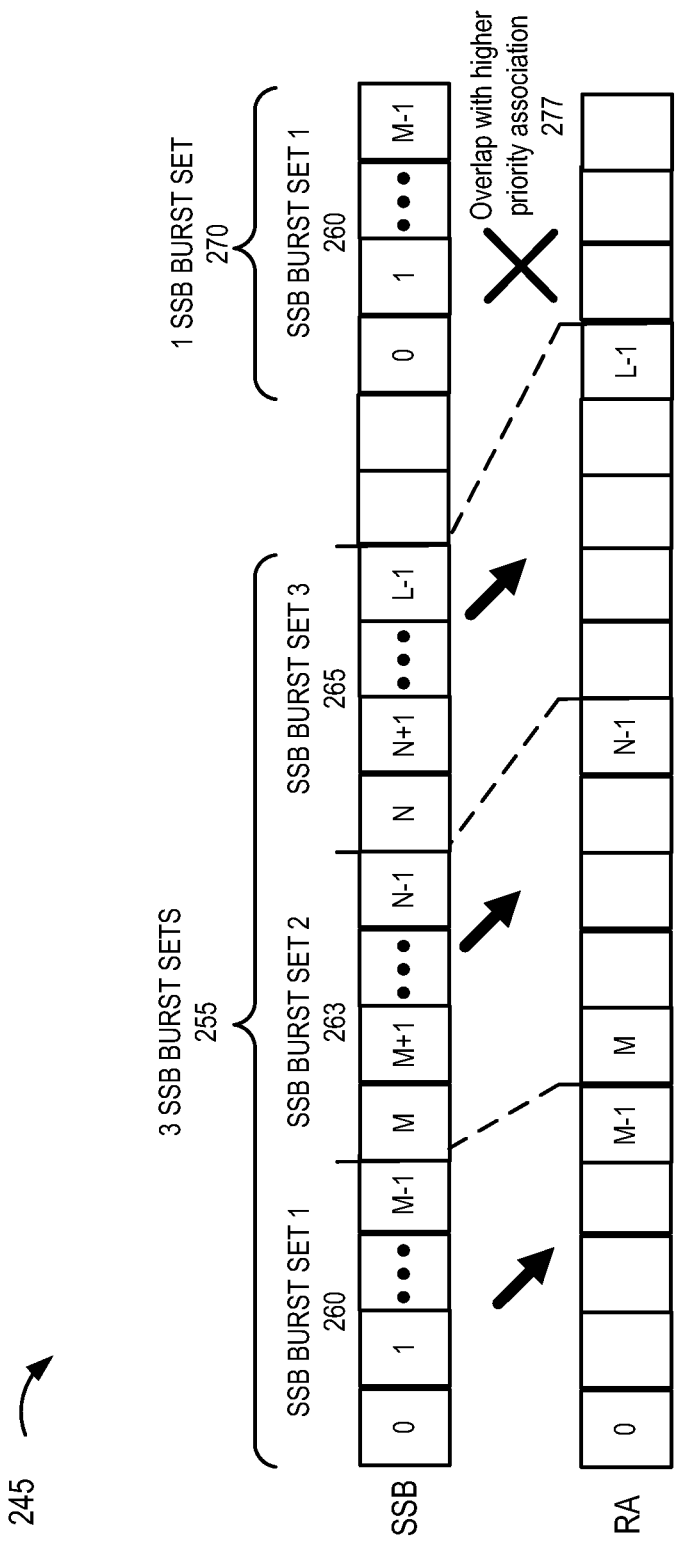
FIG. 2B is a diagrams illustrating another exemplary configuration of an exemplary embodiment of the beam sweeping service.

FIG. 2B is a diagram illustrating another exemplary configuration 245 of an exemplary embodiment of the beam sweeping service. According to an exemplary embodiment, the beam sweeping service may provide that a RACH association or opportunity with SSB burst sets transmissions may be based on a tiered or priority system, as described herein. According to an exemplary embodiment, the beam sweeping service may provide that a RACH configuration, as described herein, is executed by access device 107 and end device 130.

According to an exemplary embodiment, a RACH association corresponding to more SSB burst sets than a subsequent number of SSB burst sets may have a higher RACH opportunity priority. For example, referring to FIG. 2B, according to an exemplary configuration 245, a 3 SSB burst sets 255 may include 3 SSB burst sets, such an SSB burst set 1 260, an SSB burst set 2 263, and an SSB burst set 3 265. As further illustrated, 3 SSB burst sets 255 may have a corresponding RA opportunity. Additionally, a 1 SSB burst set 270 may subsequently occur in which 1 SSB burst set 270 includes SSB burst set 1 260 (e.g., repeating). According to this example, the RA opportunities of 3 SSB burst sets 255 may have a higher priority than 1 SSB burst set 270. In view of the overlap or collision with a higher priority RA association 277, the lower priority RA opportunities associated with some or all of the SSB blocks of SSB burst set 1 260 may be cancelled or delayed.

According to an exemplary embodiment, the beam sweeping service may provide a RACH configuration that may relate to other types of priority rules. For example, a RACH association corresponding to an equal number of SSB burst sets transmissions may provide a first-come-first-serve approach. Additionally, or alternatively, a RACH association may be cancelled or delayed when an earlier RACH association is of equal or higher RACH priority.

FIG. 2B illustrates and describes an exemplary configuration of an exemplary embodiment of the beam sweeping service, however according to other exemplary embodiments, the beam sweeping service may provide a different configuration. For example, according to other exemplary embodiment, the number of SSB burst sets may be different. The tier-based RACH association may be implemented for contention-based random access and contention-free random access procedures.

According to an exemplary embodiment, a network (e.g., access network 105) and/or a network device (e.g., access device 107, a radio intelligent controller, AI/ML logic, or the like) may configure multiple SSB burst sets. The configuration may include, for each SSB burst set, a bitmap indicating which beams are within the SSB burst set and the periodicity of the SSB burst set. For example, 32 SSB beams may be configured for an SSB burst set 1 with a first period (e.g., 20 ms or another time period) while a different 32 SSB beams may be configured for an SSB burst set 2 with a different period (e.g., 160 ms or another time period). According to this example, the 64 SSB beams may cover the entire service coverage area.

End device 130 may acquire system timing based on an SSB index and system frame number (SFN) from a decoded synchronization signal (SS)/PBCH block. Based on the SSB burst sets and periodicity configuration, end device 130 may perform a beam measurement. Based on the beam measurement, end device 130 may perform an RA procedure to access a cell based on the RACH configuration, the SSB set configuration, and the RACH association rules, as described herein. For example, 1 SSB burst set may correspond to a RACH association period (e.g., 40 ms or another time period) while the 2 SSB burst set may correspond to a RACH association period of a longer time period (e.g., 80 ms or another time period). The configuration of the multiple SSB burst sets and the RACH configuration may be received by end device 130 via radio resource control (RRC) signaling. For example, for NSA, there may be dedicated RRC signaling to end device 130, while for SA, there may be common RRC signaling (e.g., system information blocks (SIBs)).

FIG. 3 is a diagram illustrating exemplary components of a device 300 that may be included in one or more of the devices described herein. For example, device 300 may correspond to access device 107, end device 130, and/or other types of devices, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, learning, model-based, etc.

Memory/storage 315 includes one or multiple memories and/or one or multiple other types of storage mediums. For example, memory/storage 315 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 315 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. As an example, with reference to access device 107, software 320 may include an application that, when executed by processor 310, provides a function and/or a process of beam sweeping service, as described herein. Additionally, with reference to end device 130, software 320 may include an application that, when executed by processor 310, provides a function and/or a process of beam sweeping service, as described herein. Software 320 may also include firmware, middleware, microcode, hardware description language (HDL), and/or other form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces and/or wired interfaces. For example, communication interface 325 may include one or multiple transmitters and receivers, or transceivers. Communication interface 325 may operate according to a protocol stack and a communication standard.

Input 330 permits an input into device 300. For example, input 330 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures and according to various network architectures. Device 300 may be implemented in the same manner. For example, device 300 may be instantiated, created, deleted, or some other operational state during its life-cycle (e.g., refreshed, paused, suspended, rebooting, or another type of state or status), using well-known virtualization technologies. For example, access device 107, end device, and/or another type of network device, as described herein, may be a virtualized device.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a function or a process described herein. Alternatively, for example, according to other implementations, device 300 performs a function or a process described herein based on the execution of hardware (processor 310, etc.).

Figure 4:
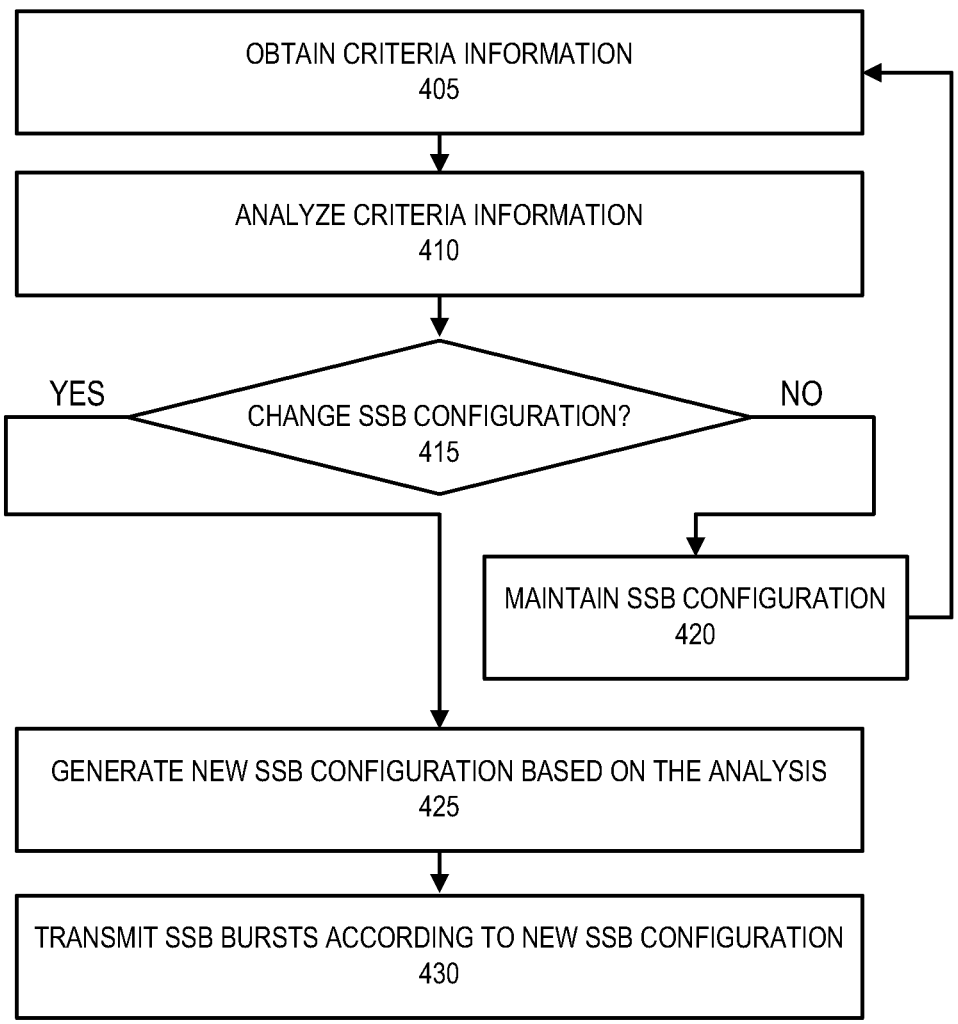
FIG. 4 is a flow diagram illustrating an exemplary process of an exemplary embodiment of the beam sweeping service.

FIG. 4 is a flow diagram illustrating an exemplary process 400 of an exemplary embodiment of the beam sweeping service. According to an exemplary embodiment, access device 107 may perform a step of process 400. For example, access device 107 may be implemented as a gNB or another suitable access device 107, as described herein. According to various exemplary embodiments, process 400 may be performed by one or multiple access devices 107. For example, the gNB may perform all steps of process 400. According to another example, some steps may be performed by the gNB and other steps may be performed by an AI/ML device, a SON device, or a RIC, for example, or jointly or cooperatively between the gNB and the AI/ML device, the SON device, or the RIC. According to an exemplary implementation, processor 310 executes software 320 to perform the step of process 400, as described herein. Alternatively, the step may be performed by execution of only hardware.

In block 405, access device 107 may obtain criteria information. For example, access device 107 may collect information relating to beam utilization, a performance metric associated with an application service, and/or another type of criterion, as described herein. The criteria information may relate to beams of the same radio spectrum or frequency band, for example. The criteria information may relate to the same coverage area (e.g., a cell, a sector, a sub-sector, an antenna array, or the like) of access device 107.

In block 410, access device 107 may analyze the criteria information. For example, access device 107 may analyze beam utilization and/or another criterion of each beam associated with a service coverage area, as described herein. Access device 107 may be configured to analyze the criteria information according to a schedule or triggering event, for example.

In block 415, access device 107 may determine whether a current SSB configuration needs to be changed based on the analysis. For example, access device 107 may correlate and compare the current beam utilization (or other criterion) associated with the beams to the current SSB configuration. Based on the correlation and/or comparison, access device 107 may determine whether the current SSB configuration aligns with the current state of a criterion of the beams.

When access device 107 determines that the SSB configuration does not need to be changed (block 415-NO), access device 107 may continue to use the current SSB configuration (block 420). Process 400 may continue or return to block 405.

When access device 107 determines that the SSB configuration needs to be changed (block 415-YES), access device 107 may generate a new SSB configuration (block 425). For example, access device 107 may identify and/or group beams satisfying different threshold values of utilization and/or another criterion, and based on such identification/grouping, generate different tiers of SSB burst sets. Additionally, access device 107 may calculate an SSB period for each tier of SSB burst set according to exemplary expression (1) described herein. Additionally, or alternatively, access device 107 may select from a pool of SSB transmission periodicities.

In block 430, access device 107 may transmit SSB bursts according to the new SSB configuration. For example, access device 107 may transmit a multi-tier SSB burst set to end device 130 in a service coverage area.

FIG. 4 illustrates an exemplary embodiment of a process of the beam sweeping service, according to other exemplary embodiments, the beam sweeping service may perform additional operations, fewer operations, and/or different operations than those illustrated and described.

Figure 5:
FIG. 5 is a flow diagram illustrating another exemplary process of an exemplary embodiment of the beam sweeping service.

FIG. 5 is a flow diagram illustrating an exemplary process 500 of an exemplary embodiment of the beam sweeping service. According to an exemplary embodiment, access device 107 may perform a step of process 500. For example, access device 107 may be implemented as a gNB or another suitable type of RAN device. According to an exemplary implementation, processor 310 executes software 320 to perform the step of process 500, as described herein. Alternatively, the step may be performed by execution of only hardware.

In block 505, access device 107 may transmit SSB burst sets according to a multi-priority configuration. For example, access device 107 may configure multiple and different SSB burst sets that have different SSB transmission periodicities, as described herein.

In block 510, access device 107 may provide RACH opportunities to end devices 130 based on the multi-priority configuration. For example, access device 107 may execute beamforming of beams associated with the multi-priority configuration that provides random access opportunities to end devices 130. The multi-priority configuration may include one or more of the RACH configuration, as described herein. Additionally, end devices 130 may execute the RACH configuration (e.g., received via RRC signaling) in collaboration with access device 107 that enables random access requests to be received by access device 107.

FIG. 5 illustrates an exemplary embodiment of a process of the beam sweeping service, according to other exemplary embodiments, the beam sweeping service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 4 and 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
generating, by a network device of a radio access network, a configuration for synchronization signal block (SSB) transmissions that includes multiple and different SSB burst sets having different periods for each SSB burst set and having different priorities relative to each other, wherein a higher priority SSB burst set has a shorter period value than a lower priority SSB burst set; and
transmitting, by the network device, the multiple SSB burst sets according to the different periods.

2. The method of claim 1, wherein an aggregate of the multiple and different SSB burst sets relate to radio beams of the network device and a service coverage area.

3. The method of claim 1, wherein the generating further comprises:
generating, by the network device, the configuration based on radio beam utilization values associated with radio beams of the network device.

4. The method of claim 1, wherein the generating further comprises:
generating, by the network device, the configuration based on performance metric values of an application service or a network slice associated with radio beams of the network device.

5. The method of claim 4, wherein the performance metric values pertain to latency and throughput.

6. The method of claim 1, further comprising:
obtaining, by the network device after the transmitting, criteria information relating to radio beams of the network device;
analyzing, by the network device, the criteria information; and
determining, by the network device in response to the analyzing, whether the configuration is to be changed.

7. The method of claim 1,
wherein the different periods include a first time period associated with a network standard and a second time period not associated with the network standard.

8. The method of claim 1, further comprising:
calculating, by the network device, the different periods based on a deployment characteristic associated with the network device including at least one of terrain, elevation coverage, or antenna tilt configuration.

9. A network device comprising:
a processor configured to:
generate a configuration for synchronization signal block (SSB) transmissions that includes multiple and different SSB burst sets having different periods for each SSB burst set and having different priorities relative to each other, wherein a higher priority SSB burst set has a shorter period value than a lower priority SSB burst, wherein the network device is of a radio access network,; and
transmit the multiple SSB burst sets according to the different periods.

10. The network device of claim 9, wherein an aggregate of the multiple and different SSB burst sets relate to radio beams of the network device and a service coverage area.

11. The network device of claim 9, wherein generating, the processor is further configured to:
generate the configuration based on radio beam utilization values associated with radio beams of the network device.

12. The network device of claim 9, wherein generating, the processor is further configured to:
generate the configuration based on performance metric values of an application service or a network slice associated with radio beams of the network device.

13. The network device of claim 12, wherein the performance metric values pertain to latency and throughput.

14. The network device of claim 9, wherein the processor is configured to:
obtain, after the transmission of the multiple SSB burst sets, criteria information relating to radio beams of the network device;
analyze the criteria information; and
determine in response to the analysis, whether the configuration is to be changed.

15. The network device of claim 9,
wherein the different periods include a first time period associated with a network standard and a second time period not associated with the network standard.

16. The network device of claim 9, wherein the processor is further configured to:
calculate the different periods based on a deployment characteristic associated with the network device including at least one terrain, elevation coverage, or antenna tilt configuration.

17. A non-transitory computer-readable storage medium storing instructions executable by a processor of a network device of a radio access network, wherein the instructions are configured to:
generate a configuration for synchronization signal block (SSB) transmissions that includes multiple and different SSB burst sets having different periods for each SSB burst set and having different priorities relative to each other, wherein a higher priority SSB burst set has a shorter period value than a lower priority SSB burst set; and
transmit the multiple SSB burst sets according to the different periods.

18. The non-transitory computer-readable storage medium of claim 17, wherein the multiple and different SSB burst sets have different priorities relative to each other and a higher priority SSB burst set has a shorter period value than a lower priority SSB burst set.

19. The non-transitory computer-readable storage medium of claim 17,
wherein the different periods include a first time period associated with a network standard and a second time period not associated with the network standard.

20. The non-transitory computer-readable storage medium of claim 17, wherein the instructions are further configured to:
generate the configuration based on radio beam utilization values associated with radio beams of the network device.

* * * * *